US009553871B2

(12) United States Patent
Fan

(10) Patent No.: US 9,553,871 B2
(45) Date of Patent: Jan. 24, 2017

(54) CLOCK SYNCHRONIZED DYNAMIC PASSWORD SECURITY LABEL VALIDITY REAL-TIME AUTHENTICATION SYSTEM AND METHOD THEREOF

(71) Applicant: Hangzhou Wopuwulian Science & Technology Co., LTD, Hangzhou (CN)

(72) Inventor: Xiaodong Fan, Hangzhou (CN)

(73) Assignee: HANGZHOU WOPUWULIAN SCIENCE & TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 15/035,224

(22) PCT Filed: Apr. 15, 2015

(86) PCT No.: PCT/CN2015/076685
§ 371 (c)(1),
(2) Date: May 7, 2016

(87) PCT Pub. No.: WO2016/065861
PCT Pub. Date: May 6, 2016

(65) Prior Publication Data
US 2016/0277393 A1    Sep. 22, 2016

(30) Foreign Application Priority Data

Oct. 31, 2014    (CN) .......................... 2014 1 0605962

(51) Int. Cl.
*H04L 12/00* (2006.01)
*H04L 29/06* (2006.01)
(Continued)

(52) U.S. Cl.
CPC ............. *H04L 63/0846* (2013.01); *G06F 1/14* (2013.01); *H04L 9/32* (2013.01); *H04L 63/0838* (2013.01);
(Continued)

(58) Field of Classification Search
CPC . G06K 19/0723; H04L 63/0846; H04L 67/12; H04L 67/04; H04L 9/32; H04L 63/0838
(Continued)

(56) References Cited

U.S. PATENT DOCUMENTS

2008/0061152 A1*  3/2008  Shingai .............. G06K 19/0723
235/492

FOREIGN PATENT DOCUMENTS

| CN | 102968606 A | 3/2013 |
| CN | 103312516 A | 9/2013 |
| CN | 103354499 A | 10/2013 |

* cited by examiner

*Primary Examiner* — Alexander Lagor
(74) *Attorney, Agent, or Firm* — Gokalp Bayramoglu

(57) ABSTRACT

This invention discloses a clock synchronized dynamic password security label validity real-time authentication system and method thereof, which comprises, the electronic label module, the user authentication terminal module, and the authentication service module. The electronic label module is used for generating the dynamic password data and displaying. The user authentication terminal module captures the dynamic password data generated by the electronic label module and the image data of the ID number of the electronic label module. After the analyzing processing, the text data is obtained, and then is sent to the authentication service module through the Internet. After receiving the text data, the authentication service module obtains the result of whether the first dynamic password data generating algorithm of the electronic label module is consistent with the second dynamic password data generating algorithm of the authentication service module. The result is returned to the user authentication terminal module.

8 Claims, 4 Drawing Sheets

(51) Int. Cl.
 *H04L 9/32* (2006.01)
 *G06F 1/14* (2006.01)
 *H04L 29/08* (2006.01)
 *G06K 19/07* (2006.01)

(52) U.S. Cl.
 CPC ........... *G06K 19/0723* (2013.01); *H04L 67/04* (2013.01); *H04L 67/12* (2013.01)

(58) Field of Classification Search
 USPC .................................. 726/7, 4, 5; 340/572.1
 See application file for complete search history.

S201: assigning a unique ID number to each electronic label module, wherein the ID number is expressed as IDS1, and is located on the surface of the electronic label module. An identical clock accumulating cycle is defined in the electronic label module and the authentication server module. The product information and related information are written into a service configuring unit. A torrent file for associating the electronic label module with the authentication service module is defined. Saving the data TDSH in the application configuring unit represents that a self-destruction device of the electronic label module has been damaged. The PSW field is written into the record corresponding to ID number IDS1 in the service configuring unit.

↓

S202: turning the electronic label module on via the switch unit. Then the torrent file is written via the torrent writing unit, meanwhile, the torrent file is written into the record corresponding to the IDS1 in the service configuring unit of the authentication service module through the internet.

↓

S203: turning the electronic label module on via the switch unit. The manage unit detects whether the self-destruction trigger unit is damaged. If the self-destruction trigger unit is damaged, the electronic label module outputs the specific data TDSH via a display unit, representing that the electronic label module has already stopped working. If the self-destruction trigger unit works properly, the managing unit of the electronic label module initializes the clock data to DSS1 at the first clock change cycle according to the clock change cycle of a clock control unit. The managing unit uses the clock data DSS1, the random number RandomD, the ID number IDS1 of the electronic label in the torrent file, as calculation factors, to generate a dynamic password data DKS1 by a dynamic password generating algorithm PSW1 of a first dynamic password configuring unit. Then the first dynamic password data DKS1 is displayed on the display unit. Then the managing unit accumulates the initial clock data DSS1 to obtain the DSS2 according to the predefined clock accumulating cycle. Then the DDS2 is saved in the cache.

↓

S204: capturing, via the image capturing unit controlled by the application managing unit of the user authentication terminal module, the image data IDT1 of the electronic label module, wherein the image data IDT1 of the electronic label module comprises the dynamic password data displayed on the display unit, and the ID number IDS1 of the electronic label module located on the surface of the electronic label module. The application managing unit of the user authentication terminal module locates, segments, and analyzes the image data IDT1 via the image analysis unit to obtain a dynamic password data DZXS displayed on the display unit of the electronic label module and the ID number IDS1 of the electronic label module. Then searching is conducted in the application configuring unit. If the DZXS equals to the TDSH, which indicates that the self-destruction device of the electronic label module is damaged, the authenticating process ends. If the DZXS does not equal to the TDSH, the IDS1 is saved into the application configuring unit. The IDS1 and the DZXS are sent to the authentication service module via the data communication unit connected to the internet.

↓

S205: receiving the data IDS1 and the DZXS sent from the user authentication terminal module. Subsequently, the authentication service unit searches the record corresponding to the IDS1 in the service configuring unit using the IDS1, and extracts the dynamic password generating algorithm PSW2 adopted by the electronic label module represented by the clock data DSS1, the random number RandomD, and the IDS1 that are initially written into the torrent file. Then the authentication service unit obtains the system time RSS1 of the current authentication service module, and subtracts the DSS1 from the RSS1 to obtain a result. The result is divided by the initially defined clock accumulating cycle to obtain the RZSC which is the number of times the electronic label module accumulated in accordance with the clock accumulating cycle. Finally, the dynamic password data RKS1 is calculated using the RandomD, the DSS1, the RZSC, and the IDS1 as calculation factors through the dynamic password generating algorithm PSW2 of the second dynamic password configure unit.

↓

S206: the authentication service unit compares the calculated RKS1 with the DZXS. If the RKS1 equals to the DZXS, the result indicating that this electronic label module is valid is sent to the user authentication terminal module through the internet. If the RKS1 does not equal to the DZXS, the result indicating that this electronic label module is not valid is sent to the user authentication terminal module through the internet.

↓

S207: after the user authentication terminal module receives the result fed back from the authentication service module, the user authentication terminal module displays the result, so as to complete this validity authentication process with respect to the electronic label module.

Fig. 2

CLOCK SYNCHRONIZED DYNAMIC PASSWORD SECURITY LABEL VALIDITY REAL-TIME AUTHENTICATION SYSTEM AND METHOD THEREOF

TECHNICAL FIELD OF THE INVENTION

This invention belongs to the technical field of electronic security, especially relates to a clock synchronized dynamic password security label validity real-time authentication system and method thereof.

BACKGROUND OF THE INVENTION

With the rapid development of society, consumption ability of people is constantly improving. Many criminals began to reap huge profits by means of counterfeit. This not only causes economic and even physical harm to people, but also causes serious adverse effects on social development. In such environment, the anti-counterfeiting industry becomes more and more important. However, the common security label is usually in the forms of laser, scratch cards, bar code, dimensional code and so on. Each kind of the label has its own convenience, but all of these labels are unchangeable, and can be easily copied.

RFID and NFC are common forms used in the field of the electronic label module. Such labels all require special verification terminals to read, and rely on the professional system to authenticate the validity. It is neither conducive to its popularity among users, nor is it available for users to do real-time authentication anytime anywhere.

The output of dynamic password card is a time change password that is valid for only one time. It has anti-fake characteristics. However, traditional clock type dynamic password card is mainly used in online banking for identity authentication system. Users need to log in the website first, and then manually input the dynamic password data into the server for authentication. If this is applied to the security industry, it is obviously inconvenient for users to use, which subsequently results in its unpopularity.

SUMMARY OF THE INVENTION

The purpose of one embodiment of the invention is to provide a clock synchronized dynamic password security label validity real-time authentication system and method thereof, which aims to solve the following problem in the field of electronic label module, i.e., the special authentication terminal is needed for reading and the professional system is relied on to verify the validity, which is adverse to its popularity and is inconvenient for users to use anytime anywhere.

One embodiment of the invention is achieved by a clock synchronized dynamic password security label validity real-time authentication method. The clock synchronized dynamic password security label validity real-time authentication method comprises the following steps.

Step one, assigning a unique ID number to each electronic label module, wherein the ID number is expressed as IDS1 and located on the surface of the electronic label module. An identical clock accumulating cycle is defined in the electronic label module and the authentication server module. The product information and related information are written into a service configuring unit, wherein the product information and the related information are represented by the ID number IDS1 of the electronic label module. A torrent file for associating the electronic label module with the authentication service module is defined, wherein the torrent file includes the clock data DSS1, the random number RandomD, and the ID number IDS1 of the electronic label module. Saving the data TDSH in the application configuring unit represents that a self-destruction device of the electronic label module has been damaged. The PSW field, which is used to represent the type of the dynamic password generating algorithm used by the electronic label module whose ID number is IDS1, is written into the record corresponding to ID number IDS1 in the service configuring unit.

Step two, the user turns on the electronic label module via the switch unit. A managing unit detects whether the self-destruction trigger unit is damaged. If the self-destruction trigger unit is damaged, the electronic label module outputs specific data TDSH via the display unit, which represents that the electronic label module has already stopped working. If the self-destruction trigger unit works properly, the managing unit of the electronic label module initializes the clock data to DSS1 at the first clock change cycle according to the clock change cycle of a clock control unit. The managing unit uses the clock data DSS1, the random number RandomD, the ID number IDS1 of the electronic label in the torrent file, as calculation factors, to generate a first dynamic password data DKS1 via a dynamic password generating algorithm PSW1 of a first dynamic password configuring unit, and displays the DKS1 on the display unit; then the managing unit accumulates the initial clock data DSS1 according to the predefined clock accumulating cycle to obtain a second clock data DSS2, and saves the DDS2 in the cache.

Step three, the application managing unit of the user authentication terminal module controls the image capturing unit to collect the image data TDT1 of the electronic label module, wherein the image data IDT1 of the electronic label module includes the dynamic password data displayed on the display unit, and the ID number IDS1 of the electronic label module located on the surface of the electronic label module. The application managing unit of the user authentication terminal module locates, segments, and analyzes the image data IDT1 via the image analysis unit to obtain a dynamic password data DZXS displayed on the display unit of the electronic label module and the ID number IDS1 of the electronic label module. Then searching is conducted in the application configuring unit. If the DZXS equals to the TDSH, which indicates that the self-destruction device of the electronic label module is damaged, the authenticating process ends. If the DZXS does not equal to the TDSH, the IDS1 is saved into the application configuring unit. The IDS1 and the DZXS are sent to the authentication service module via the data communication unit connected to the internet.

Furthermore, turning on the electronic label module via the switch unit occurs after step one. Then the torrent file is written via the torrent writing unit, meanwhile, the torrent file is written into the record corresponding to the ID number IDS1 of the service configuring unit of the authentication service module through the internet.

Furthermore, after step three, the authentication service module receives the data IDS1 and the DZXS sent from the user authentication terminal module. Subsequently, the authentication service unit searches the record corresponding to the IDS1 in the service configuring unit using the IDS1, and extracts the dynamic password generating algorithm PSW2 adopted by the electronic label module, which is represented by the clock data DSS1, the random number RandomD, and the IDS1 that are initially written into the torrent file. Then the authentication service unit obtains the system time RSS1 of the current authentication service module, subtracts the DSS1 from the RSS1 to obtain a result. The result is divided by the initially defined clock accumulating cycle to obtain the RZSC which is the number of times the electronic label module accumulated in accordance with the clock accumulating cycle. Finally, the dynamic password data RKS1 is calculated using the RandomD, the DSS1, the RZSC, and the IDS1 as calculation factors through the dynamic password generating algorithm PSW2 of the second dynamic password configuring unit.

The authentication service unit compares the calculated RKS1 with the DZXS. If the RKS1 equals to the DZXS, the result indicating that this electronic label module is valid is sent to the user authentication terminal module through the internet. If the RKS1 does not equal to the DZXS, the result indicating that this electronic label module is not valid is sent to the user authentication terminal module through the internet.

After the user authentication terminal module receives the result fed back from the authentication service module, the user authentication terminal module displays the result, so as to complete this validity authentication process with respect to the electronic label module.

Another purpose of one embodiment the invention is to provide a clock synchronized dynamic password security label validity real-time authentication system, wherein the clock synchronization dynamic password security label validity real-time authentication system comprises: the electronic label module, the user authentication terminal module, and the authentication service module.

The electronic label module is used for generating dynamic password data and displaying. The electronic label module comprises the managing unit, the switch unit, the torrent writing unit, the first clock control unit, the first dynamic password configuring unit, the self-destruction trigger unit, and the display unit.

The user authentication terminal module is connected with the electronic label module. It is used for capturing the dynamic password data generated by the electronic label module and the image data of the ID number of the electronic label module. After analyzing, the text data is obtained. Then the text data is sent to the authentication service module through the internet. The user authentication terminal module comprises: the application managing unit, the image capturing unit, the image analysis unit, the application configuring unit, the data input unit, and the data communication unit.

The authentication service module is connected with the user authentication terminal module. After receiving the text data, the authentication service module is used for, after calculating and authenticating, obtaining the result of whether the first dynamic password generating algorithm of the electronic label module is consistent with the second dynamic password generating algorithm of the authentication service module. The result is returned to the user authentication terminal module, so as to determine the validity of the electronic label module. The authentication service module comprises the authentication service unit, the second clock control unit, the service configuring unit, and the second dynamic password configuring unit.

Furthermore, the electronic label module further comprises the managing unit, the switch unit, the torrent writing unit, the first clock control unit, the first dynamic password configuring unit, the self-destruction trigger unit, and the display unit.

The managing unit is used for detecting whether the self-destruction trigger unit is damaged; initializing the clock data to DSS1 during the first clock change cycle according to the clock change cycle of the first clock control unit; using the clock data DSS1, the random number RandomD, the ID number IDS1 of the electronic label module as calculation factors, wherein the clock data DSS1, the random number RandomD, the ID number IDS1 are stored in the torrent file; generating the dynamic password data DKS1 via the dynamic password generating algorithm PSW1 of the first dynamic password configuring unit, and then displaying the first dynamic password data DKS1 on the display unit; then obtaining DSS2 by accumulating the initial clock data DSS1 according to the predefined clock accumulating cycle, and saving the DDS2 in the cache.

The switch unit is connected with the managing unit, and is used for turning on the electronic label module.

The torrent writing unit is connected with the managing unit, and is used for writing the torrent file.

The first clock control unit is connected with the managing unit, and is used for outputting the clock change cycle.

The first dynamic password configuring unit is connected with the managing unit, and is used for generating the first dynamic password data DKS1 via the dynamic password generating algorithm PSW1.

The self-destruction trigger unit is connected with managing unit, and is used for sending the damage signal.

The display unit is connected with managing unit, and is used for displaying the dynamic password data DKS1.

Furthermore, the first dynamic password generating algorithm in the first dynamic password configuring unit uses the State Encryption Algorithm.

The managing unit transmits the own ID number of the electronic label module and the clock data or the number of times of generating the dynamic password as calculation factors to the first dynamic password configuring unit, to obtain the dynamic password data. The dynamic password data can use numbers, characters, the combination of numbers and characters, the bar code, the two-dimension code, or any password expression form.

The electronic label module transmits the data to the user authentication terminal module using a display screen, an NFC, a RFID, infrared, or any communication method.

Furthermore, a dynamic password data authentication method of the electronic label module, the structure of the user authentication terminal module and the authentication service module. The image analysis unit of the user authentication terminal module is located in the authentication service module The user authentication terminal module is only responsible for capturing the dynamic password data which is displayed on the electronic label module, and sending the collected image data to the authentication service module The authentication service module analyzes the image data, and converts the data format and authenticates the converted image data.

The dynamic password authentication method of the electronic label module, the structure of the user authentication terminal module and the authentication service module. When the network is bad, the authentication service unit, the service configuring unit, and the second dynamic password configuring unit in the authentication service module are located into the user authentication terminal module. After collecting the dynamic password data of the electronic label module, the user authentication terminal module completes the authentication service directly in an offline mode.

Furthermore, the user authentication terminal module comprises: the application managing unit, the image capturing unit, the image analysis unit, the application configuring unit, the data input unit, and the data communication unit.

The application managing unit is used for controlling the image capturing unit to capture the image data IDT1 of the electronic label module; the image analysis unit locates, segments, and analyzes the image data IDT1, to obtain the dynamic password data DZXS displayed on the display unit and the ID number IDS1 of the electronic label module can be obtained Then searching is conducted in the application configuring unit.

The image capturing unit is connected with the application managing unit, and is used for collecting the image data IDT1 of the electronic label module.

The image analysis unit is connected with the application managing unit, and is used for locating, segmenting and analyzing the image data IDT1.

The application configuring unit is connected to the application managing unit, and is used for searching whether the dynamic password data DZXS is consistent with the ID number IDS1 of the electronic label module.

The data input unit is connected to the application managing unit, and is used for inputting the dynamic password data DZXS for searching.

The data communication unit is connected to the application managing unit, and is used for sending the IDS1 and the DZXS to the authentication service module through the internet.

Furthermore, the authentication service module comprises the authentication service unit, the second clock control unit, the service configuring unit, and the second dynamic password configuring unit.

The authentication service unit is used for extracting the dynamic password generating algorithm PSW2 adopted by the electronic label module, which is represented by the clock data DSS1, the random number RandomD, and the ID number IDS1 that are initially written into the torrent file; obtaining the system time RSS1 of the current authentication service module; calculating the dynamic password data RKS1 via the dynamic password generating algorithm PSW2 of the second dynamic password configuring unit; comparing the calculated RKS1 with the DZXS.

The second clock control unit is connected to the authentication service unit, and is used for providing the clock signal for the authentication service unit.

The service configuring unit is connected with the authentication service unit, and is used for searching the record corresponding to IDS1.

The second dynamic password configuring unit is connected to the authentication service unit, and is used for calculating the dynamic password data RKS1 via the dynamic password generating algorithm PSW2.

Furthermore, the service configuring unit is a database which can be read and written by the authentication service unit. The service configuring unit configures the characteristic of the electronic label module using the ID of the electronic label module, and saves the product information represented by the electronic label module and the characteristic of the electronic label module in the database.

Multiple dynamic password generating algorithms corresponding to the electronic label module are positioned in the second dynamic password configuring unit of the authentication service module.

The invention provides a clock synchronization dynamic password security label validity real-time authentication system and method thereof, configuring the electronic label module, the user authentication terminal module, and the authentication service module. The invention overcomes the invariability and duplicability of existing labels. The image recognition technology is used, providing a convenient authentication method for users. The self-destruction device is adopted, which allows users to authenticate before purchase behavior occurs. The combination of multiple dynamic password algorithm is used, which significantly improves the safety of the dynamic password. Various data hidden in the electronic label module is used, namely using the random number and the clock data as the calculation factors, so that each electronic label module has a different password. Meanwhile, the password data generated by each electronic label module is valid for only once, which noticeably improves the safety of the system. The invention matches the password generating algorithm according to the ID of the electronic label module, which remarkably improves the individualized management of the clock synchronized dynamic password security label validity real-time authentication system, and also greatly increases the safety of the clock synchronized dynamic password security label validity real-time authentication system.

BRIEF DESCRIPTION OF THE DRAWINGS

FIG. 2 is a flow chart of a clock synchronized dynamic password security label validity real-time authentication method as provided by an embodiment of the invention.

Wherein: 1. Electronic label module; 1-1. Managing unit; 1-2. Switch unit; 1-3. Torrent writing unit; 1-4. First clock control unit; 1-5. First dynamic password configuring unit; 1-6. Self-destruction trigger unit; 1-7. Display unit; 2. User authentication terminal module; 2-1 Application managing unit; 2-2. Image capturing unit; 2-3. Image analysis unit; 2-4. Application configuring unit; 2-5. Data input unit; 2-6. Data communication unit; 3. Authentication service module; 3-1. Authentication service unit; 3-2. Second clock control unit; 3-3. Service configuring unit; 3-4. Second dynamic password configuring unit.

DETAILED DESCRIPTION OF THE INVENTION

In order to clarify the purpose, the technical solution, and advantages of the invention, a further detailed description in conjunction with the embodiments is shown below. It should be understood that embodiments here are only used to illustrate the invention. However, the present application is not limited thereto.

The principle of the invention will be further described in conjunction with the drawings and specific embodiments as follow.

Figure 1:
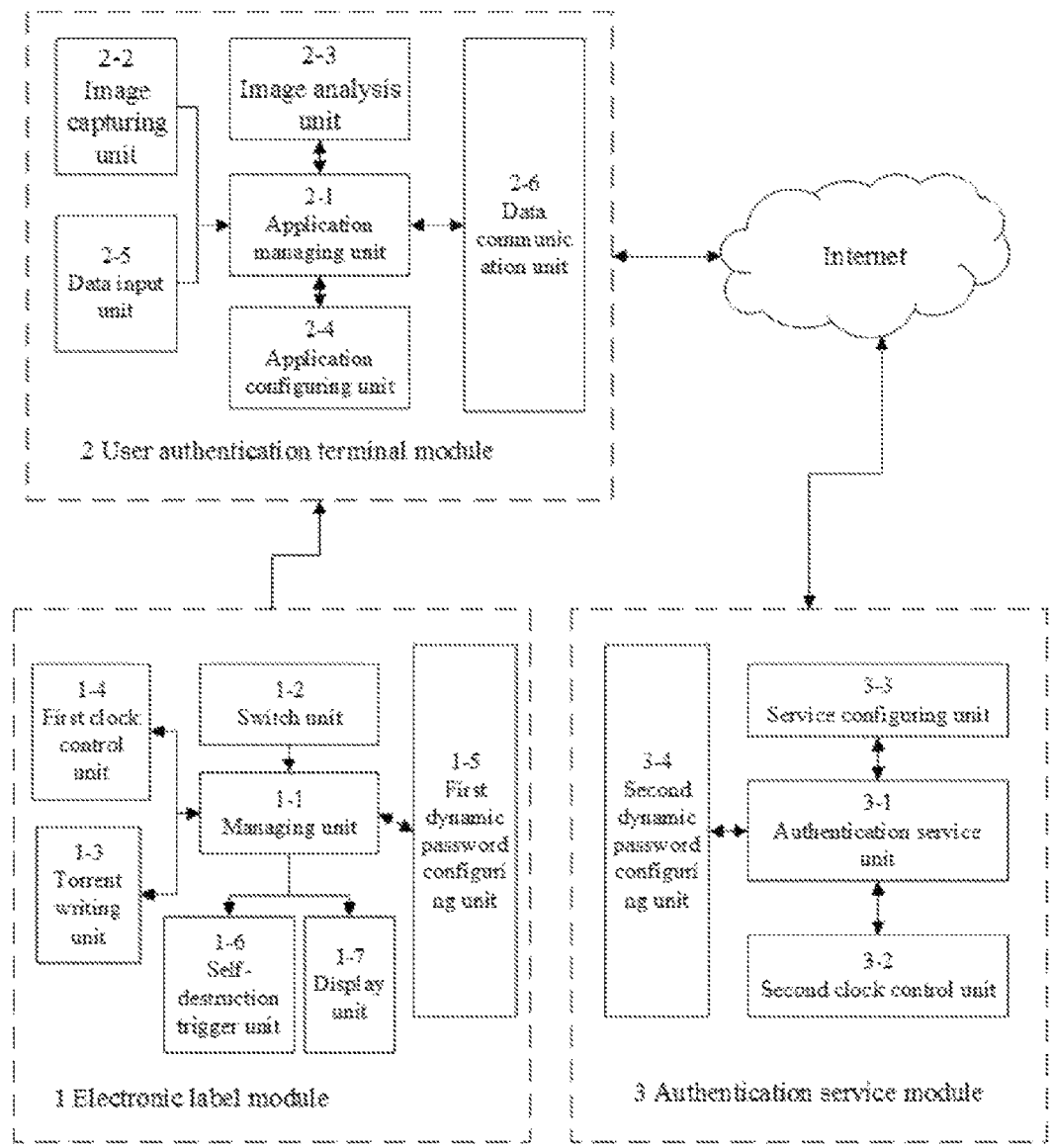
FIG. 1 is a schematic diagram of a clock synchronized dynamic password security label validity real-time authentication system as provided by an embodiment of the invention.

As shown in FIG. 1, a clock synchronized dynamic password security label validity real-time authentication system of an embodiment of the invention comprises: the electronic label module 1, the user authentication terminal module 2, and the authentication service module 3.

The electronic label module 1 is used for generating dynamic password data and displaying the dynamic password data.

The user authentication terminal module 2 is connected to the electronic label module 1, and is used for capturing the dynamic password data generated by the electronic label module 1 and the image data of the ID number of the electronic label module; after analyzing, the text data are obtained. Then the text data are sent to the authentication service module 3 through the internet.

The authentication service module 3 is connected to the user authentication terminal module 2. After receiving the text data, the authentication service module is used for after calculating and authenticating, obtaining the result of whether the first dynamic password data generating algorithm of electronic label module 1 is consistent with the second dynamic password data generating algorithm of authentication service module 3, and returning the result to the user authentication terminal module 2, so as to determine the validity of the electronic label module 1.

The electronic label module 1 further comprises the managing unit 1-1, the switch unit 1-2, the torrent writing unit 1-3, the first clock control unit 1-4, the first dynamic password configuring unit 1-5, the self-destruction trigger unit 1-6, and the display unit 1-7.

The managing unit 1-1 is used for detecting whether the self-destruction trigger unit 1-6 is damaged, initialing the clock data to DSS1 during the first clock change cycle according to the clock change cycle of first clock control unit 1-4; generate the dynamic password data DKS1 by the dynamic password generating algorithm PSW1 of the first dynamic password configuring unit 1-5 using the clock data DSS1, the random number RandomD, the ID number IDS1 of the electronic label module 1 in the torrent data as calculation factors; and displaying the DKS1 on the display unit 1-7; then accumulating the initial clock data DSS1 according to the predefined clock accumulating cycle to obtain the DSS2, and saving the DDS2 in the cache.

The switch unit 1-2 is connected with the managing unit 1-1, and is used for turning on the electronic label module 1.

The torrent writing unit 1-3 is connected with the managing unit 1-1, and is used for writing the torrent file.

The first clock control unit 1-4 is connected with the managing unit 1-1, and is used for outputting the clock change cycle.

The first dynamic password configuring unit 1-5 is connected with the managing unit 1-1, and is used for generating dynamic password data DKS1 via dynamic password generating algorithm PSW1.

The self-destruction trigger unit 1-6 is connected with managing unit 1-1, and is used for sending a damage signal.

Display unit 1-7 is connected with managing unit 1-1, and is used for displaying the dynamic password data DKS1.

The user authentication terminal module 2 comprises: the application managing unit 2-1, the image capturing unit 2-2, the image analysis unit 2-3, the application configuring unit 2-4, the data input unit 2-5, and the data communication unit 2-6.

The application managing unit 2-1 is used for controlling image capturing unit 2-2 to capture the image data IDT1 of the electronic label module. The image analysis unit 2-3 locates, segments, and analyzes the image data IDT1, so as to obtain the dynamic password data DZXS displayed on the display unit 1-7 of electronic label module 1, and ID number IDS1 of the electronic label; and then search in the application configuring unit 2-4.

The image capturing unit 2-2 is connected with application managing unit 2-1, and is used for capturing the image data IDT1 of the electronic label module.

The image analysis unit 2-3 is connected with application managing unit 2-1, and is used for locating, segmenting, and analyzing the image data IDT1.

The application configuring unit 2-4 is connected to application managing unit 2-1, and is used for searching whether the dynamic password data DZXS is consistent with ID number IDS1 of the electronic label module. The data input unit 2-5 is connected to application managing unit 2-1, and is used for inputting the dynamic password data DZXS for searching.

The data communication unit 2-6 is connected to application managing unit 2-1, and is used for sending the IDS1 and the DZXS to authentication service module 3 through the internet.

Authentication service module 3 further includes the authentication service unit 3-1, the second clock control unit 3-2, the service configuring unit 3-3, and second dynamic password configuring unit 3-4.

The authentication service unit 3-1 is used for extracting dynamic password generating algorithm PSW2 adopted by the electronic label module, which is represented by clock data DSS1, random number RandomD, and IDS1 that are initially written into the torrent file. The system time RSS1 of the current authentication service module is obtained. The dynamic password data RKS1 is calculated via dynamic password generating algorithm PSW2 of second dynamic password configuring unit 3-4. The calculated dynamic password data RKS1 is compared with the dynamic password data DZXS.

The second clock control unit 3-2 is connected to authentication service unit 3-1, and is used for providing a clock signal for authentication service unit 3-1.

The service configuring unit 3-3 is connected with authentication service unit 3-1, and is used for searching the record corresponding to ID number IDS1.

The second dynamic password configuring unit 3-4 is connected to authentication service unit 3-1, and is used for calculating the dynamic password data RKS1 via dynamic password generating algorithm PSW2.

As shown in FIG. 2. One embodiment of clock synchronized dynamic password security label validity real-time authentication method, comprises the following steps.

S201: assigning a unique ID number to each electronic label module, wherein the ID number is expressed as IDS1, and is located on the surface of the electronic label module. An identical clock accumulating cycle is defined in the electronic label module and the authentication server module. The product information and related information are written into a service configuring unit, wherein the product information and the related information are represented by ID number IDS1 of the electronic label module. A torrent file for associating the electronic label module with the authentication service module is defined, wherein the torrent file comprises the clock data DSS1, the random number RandomD, and the ID number IDS1 of the electronic label module. Saving the data TDSH in the application configuring unit represents that a self-destruction device of the electronic label module has been damaged. The PSW field, which is used to represent the type of the dynamic password generating algorithm used by the electronic label module whose ID number is IDS1, is written into the record corresponding to ID number IDS1 in the service configuring unit.

S202: the electronic label module is turned on via the switch unit. Then the torrent file is written via the torrent writing unit, meanwhile, the torrent file is written into the record corresponding to the IDS1 in the service configuring unit of the authentication service module through the internet.

S203: the electronic label module is turned on via the switch unit. The mange unit detects whether the self-destruction trigger unit is damaged. If the self-destruction trigger unit is damaged, the electronic label module outputs the specific data TDSH via a display unit, representing that the electronic label module has already stopped working. If the self-destruction trigger unit works properly, the managing unit of the electronic label module initializes the clock data to DSS1 at the first clock change cycle according to the clock change cycle of a clock control unit. The managing unit uses the clock data DSS1, the random number RandomD, the ID number IDS1 of the electronic label in the torrent file, as calculation factors, to generate a dynamic password data DKS1 by a dynamic password generating algorithm PSW1 of a first dynamic password configuring unit. Then the first dynamic password data DKS1 is displayed on the display unit. Then the managing unit accumulates the initial clock data DSS1 to obtain the DSS2 according to the predefined clock accumulating cycle. Then the DDS2 is saved in the cache.

S204: the application managing unit of the user authentication terminal module controls the image capturing unit to capture the image data TDT1 of the electronic label module, wherein the image data IDT1 of the electronic label module comprises the dynamic password data displayed on the display unit, and the ID number IDS1 of the electronic label module located on the surface of the electronic label module. The application managing unit of the user authentication terminal module locates, segments, and analyzes the image data IDT1 via the image analysis unit to obtain a dynamic password data DZXS displayed on the display unit of the electronic label module and the ID number IDS1 of the electronic label module. Then searching is conducted in the application configuring unit. If the DZXS equals to the TDSH, which indicates that the self-destruction device of the electronic label module is damaged, the authenticating process ends. If the DZXS does not equal to the TDSH, the IDS1 is saved into the application configuring unit. The IDS1 and the DZXS are sent to the authentication service module via the data communication unit connected to the internet.

S205: the authentication service module receives the data IDS1 and the DZXS sent from the user authentication terminal module. Subsequently, the authentication service unit searches the record corresponding to the IDS1 in the service configuring unit using the IDS1, and extracts the dynamic password generating algorithm PSW2 adopted by the electronic label module represented by the clock data DSS1, the random number RandomD, and the IDS1 that are initially written into the torrent file. Then the authentication service unit obtains the system time RSS1 of the current authentication service module, and subtracts the DSS1 from the RSS1 to obtain a result. The result is divided by the initially defined clock accumulating cycle to obtain the RZSC which is the number of times the electronic label module accumulated in accordance with the clock accumulating cycle. Finally, the dynamic password data RKS1 is calculated using the RandomD, the DSS1, the RZSC, and the IDS1 as calculation factors through the dynamic password generating algorithm PSW2 of the second dynamic password configure unit.

S206: the authentication service unit compares the calculated RKS1 with the DZXS. If the RKS1 equals to the DZXS, the result indicating that this electronic label module is valid is sent to the user authentication terminal module through the internet. If the RKS1 does not equal to the DZXS, the result indicating that this electronic label module is not valid is sent to the user authentication terminal module through the internet.

S207: after the user authentication terminal module receives the result fed back from the authentication service module, the user authentication terminal module displays the result, so as to complete this validity authentication process with respect to the electronic label module.

Furthermore, the service configuring unit is a database which can be read and written by the authentication service unit. The service configuring unit configures the characteristic of the electronic label module using the ID of the electronic label module, and saves the product information represented by the electronic label module and the characteristic of the electronic label module in the database.

Furthermore, the dynamic password generating algorithm in the dynamic password configuring unit can be the State Encryption Algorithm, manually coding algorithm, or any dynamic password generating algorithm. Moreover, the dynamic password algorithm can be one algorithm, or the combination of multiple algorithms. The invention emphasizes that the dynamic password generating algorithm of the first dynamic password configuring unit of the electronic label module and that of the second dynamic password configuring unit of the authentication service module are identical.

Furthermore, the managing unit of the electronic label module transmits the own ID number of the electronic label module and the clock data or the number of times of generating the dynamic password as calculation factors to the first dynamic password configuring unit, to obtain the dynamic password data. Since each electronic label module is given a unique ID number, and the clock data or the number of times of generating the dynamic password are continually changing, the dynamic password data generated by each electronic label module are different and are valid for once. The dynamic password data can be numbers, characters, the combination of numbers and characters, the bar code, the two-dimension code and any kind of password expression form.

Furthermore, the dynamic password data is displayed by the display unit of the electronic label module. The user authentication terminal module controls the image capturing unit to collect the data. The electronic label module can use the communication method, such as NFC, RFID, and etc., so as to transmit data to the user authentication module.

Furthermore, the method for the user authentication terminal module to collect the dynamic password data of the electronic label module, and the display unit of the electronic label module displays the dynamic password data. The user authentication terminal module controls the image capturing unit to capture the image data of the dynamic password data of the electronic label module, and converts them into the text data. The user authentication terminal can use the communication method such as NFC, RFID, infrared etc., so as to collect the dynamic password data of the electronic label module, or manually input the dynamic password data displayed on the display unit of the electronic label module into the user authentication terminal module via the data input unit via the touch screen, buttons and etc.

Furthermore, the dynamic password data authentication method of the electronic label module, and the structure of the user authentication terminal module and the authentication service module. Based on the condition of reducing the computation burden of the user authentication terminal module and saving the hardware resource, the image analysis unit of the user authentication terminal module can be located in the authentication service module. The user authentication terminal module is only responsible for collecting the dynamic password data displayed on the electronic label module, and sending the image data to the authentication service module. The authentication service module analyzes the image data, converts the data format, and authenticates the data.

Furthermore, the dynamic password data authentication method of the electronic label module, the structure of the user authentication terminal module and the authentication service module. When the network is in a bad condition, the authentication service unit, the service configuring unit, and the second dynamic password configuring unit in the authentication service module can be located in the user authentication terminal module. After the user authentication terminal module collects the dynamic password data of the electronic label module, the authenticating service is completed directly in the offline mode.

Furthermore, in the authentication service module, multiple dynamic password generating algorithms corresponding to the electronic label module can be placed in the second dynamic password configuring unit of the authentication service module.

Specific Embodiments of the Invention

Embodiment 1: based on the structure shown in FIG. 1, the equipment used in the invention comprises three parts, i.e., the electronic label module 1, the user authentication terminal module 2, and the authentication service module 3. The validity real-time authentication method for the dynamic password comprises the following steps.

Step A: a unique ID number is assigned for each electronic label module 1, wherein the ID number is expressed as IDS1 and located on the surface of electronic label module 1 The identical clock accumulating cycle is defined in the electronic label module 1 and the authentication server module 3. The product information and related information are written into the service configuring unit 3-3, wherein the product information and the related information are represented by the ID number IDS1 of electronic label module 1. The torrent file for associating electronic label module 1 with the authentication service module 3 is defined, wherein the torrent file includes the clock data DSS1, the random number RandomD, and the ID number IDS1 of electronic label module 1. Saving data TDSH in application configuring unit 2-4 represents that a self-destruction device has been damaged. A PSW field, which is used to represent the type of the dynamic password generating algorithm used by the electronic label module whose ID number is IDS1, is written into the record corresponding to ID number IDS1 of service configuring unit 3-3.

Step B: The electronic label module 1 is turned on via the switch unit 1-2. Then the torrent file is written via the torrent writing unit 1-3, meanwhile, the torrent file is writing into the record corresponding to the IDS1 in service configuring unit 3-3 of authentication service module 3 via the internet.

Step C: the user turns on the electronic label module 1 via the switch unit 1-2. The managing unit 1-1 detects whether the self-destruction trigger unit 1-6 is damaged. If the self-destruction trigger unit 1-6 is damaged, the electronic label module 1 outputs a specific data TDSH via a signal outputting unit representing that the electronic label module 1 has already stopped working. If the self-destruction trigger unit 1-6 works properly, the managing unit 1-1 of electronic label module 1 initializes the clock data to DSS1 in the first clock change cycle according to the clock change cycle of first clock control unit 1-4. The managing unit 1-1 uses the clock data DSS1, the random number RandomD, the ID number IDS1 of the electronic label in the torrent data as calculation factors, to generate the first dynamic password data DKS1 by a dynamic password generating algorithm PSW1 of the first dynamic password configuring unit 1-5. The first dynamic password data DKS1 is displayed on the display unit 1-7. Then managing unit 1-1 accumulates the initial clock data DSS1 according to the predefined clock accumulating cycle to obtain DSS2. The DDS2 is saved in the cache.

Step D: application managing unit 2-1 of user authentication terminal module 2 controls an image capturing unit 2-2 to capture the image data TDT1 of electronic label module 1, wherein image data IDT1 of electronic label module 1 comprises the dynamic password data displayed on display unit 1-7 and the ID number IDS1 of electronic label module 1 that located on the surface of electronic label module 1. The application managing unit 2-1 of user authentication terminal module 2 locates, segments, and analyzes the image data IDT1 via the image analysis unit 2-3 to obtain a second dynamic password data DZXS displayed on the display unit 1-7 the electronic label module 1 and the ID number IDS1 in the electronic label module 1. Then the search is conducted in the application configuring unit 2-4, if the DZXS equals to TDSH, which indicates that the self-destruction device of the electronic label module is damaged, the authenticating process is ended. If the DZXS does not equal to the TDSH, the ID number IDS1 is saved into the application configuring unit 2-4. Then the IDS1 and the DZXS to the authentication service module 3 via the data communication unit connected to the internet.

Step E: after the authentication service module 3 receives the data IDS1 and the DZXS sent from user authentication terminal module 2, the authentication service unit 3-1 searches the record corresponding to the IDS1 in the service configuring unit 3-3, and extracts the dynamic password generating algorithm PSW2 adopted by electronic label module 1 represented by the clock data DSS1, the random number RandomD, and the IDS1 that are initially written into the torrent file. Then the authentication service unit 3-1 receives the system time RSS1 of the current authentication service module 3, and subtracts the DSS1 from the RSS1 to obtain a result. The result is divided by the initially defined clock accumulating cycle to obtain the RZSC which is the number of times the electronic label module accumulated in accordance with the clock accumulating cycle. Finally, the dynamic password data RKS1 is calculated using the RandomD, the DSS1, the RZSC, and the IDS1 as calculation factors, through the dynamic password generating algorithm PSW2 of the second dynamic password configuring unit 3-4.

Step F: the authentication service unit 3 compares the calculated the RKS1 with the DZXS. If the RKS1 equals to the DZXS, the result indicating that this electronic label module 1 is valid is sent to the user authentication terminal module 2 through the internet If the RKS1 does not equal to the DZXS, the result indicating that this electronic label module 1 is not valid is sent to the user authentication terminal module 2 through the internet.

Step H: after the user authentication terminal module 2 receives the result fed back from the authentication service module 3, the user authentication terminal module displays the result, so as to complete this validity authentication process with respect to the electronic label module 1.

Embodiment 2: based on the structure depicted in FIG. 1, when the network is not steady or there is no network, the authentication service unit 3-1, the service configuring unit 3-3, the second dynamic password configuring unit 3-4, and the clock control unit 3-2 in the authentication service module can be located in the user authentication terminal module 2. After the user authentication terminal module 2 collects the dynamic password data of electronic label module 1, user authentication terminal module 2 completes the authenticating service directly in the offline mode.

Figure 3:
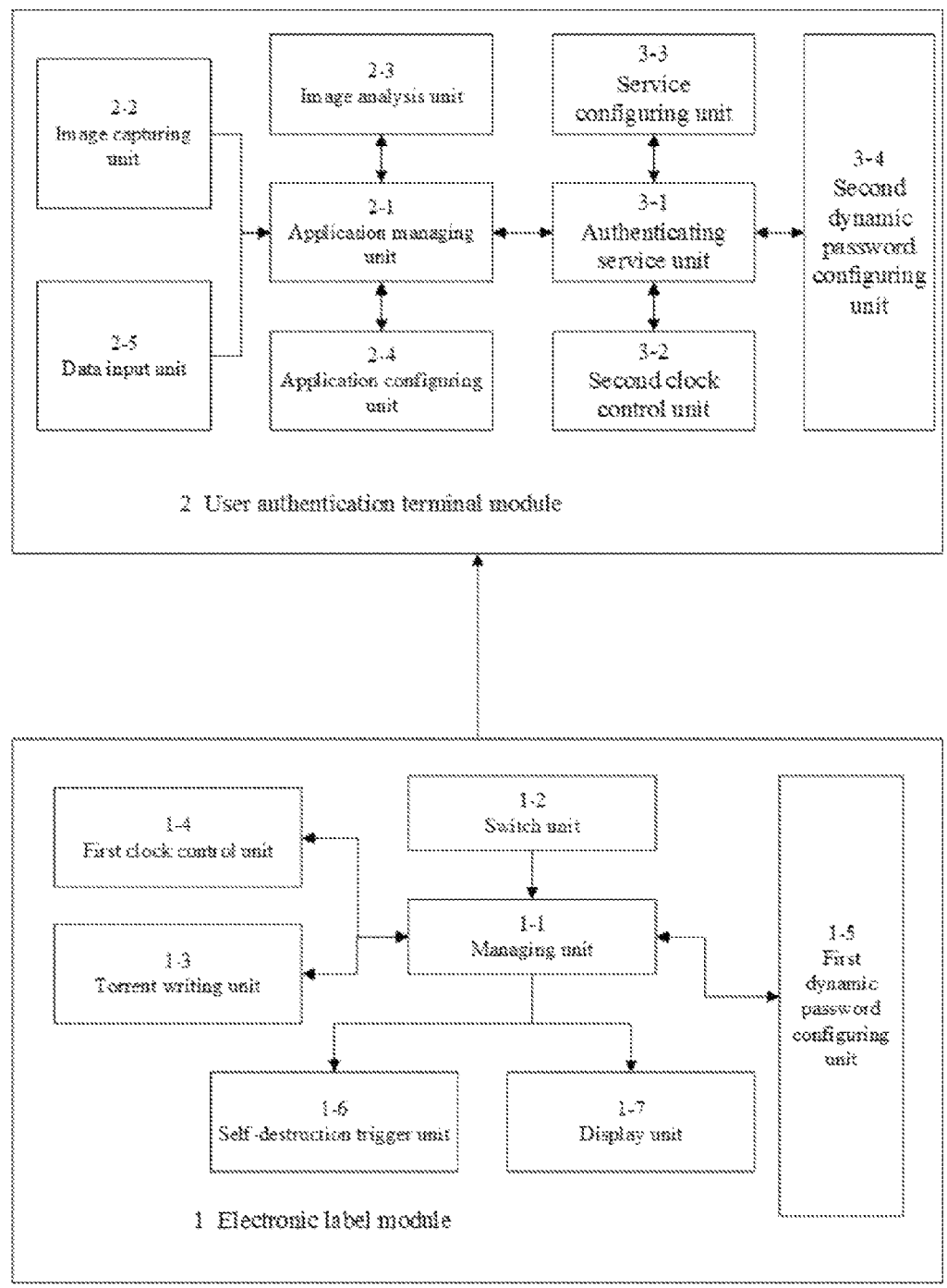
FIG. 3 is a clock synchronized dynamic password security label validity real-time authentication system of the second embodiment as provided by an embodiment of the invention.

In conjunction with the structure depicted in FIG. 3, a modification of the invention comprises two parts: the electronic label module 1 and the user authentication terminal module 2. Electronic label module 1 is used to generate the dynamic password data and display. The user authentication terminal module 2 collects the image data of the dynamic password data of electronic label module 1. After analyzing processing, the text password data is obtained. After authentication, the result of whether the first dynamic password generating algorithm of electronic label module 1 is consistent with the second dynamic password generating algorithm of user authentication terminal module 2 is obtained, such that the validity of the electronic label module is determined.

Embodiment 3: based on the structure depicted in FIG. 1, when the network is steady and it is required for the user to reduce the local computing burden of the user authentication terminal module, the image analysis unit 2-3 of user authentication terminal 2 can be located in the authentication service module 3. The user authentication terminal 2 is only responsible for collecting the data displayed on the electronic label module 1, and sending the data in the image format to the authentication service module 3 via the internet. The authentication service module 3 analyzes the image and provides the authentication service.

Figure 4:
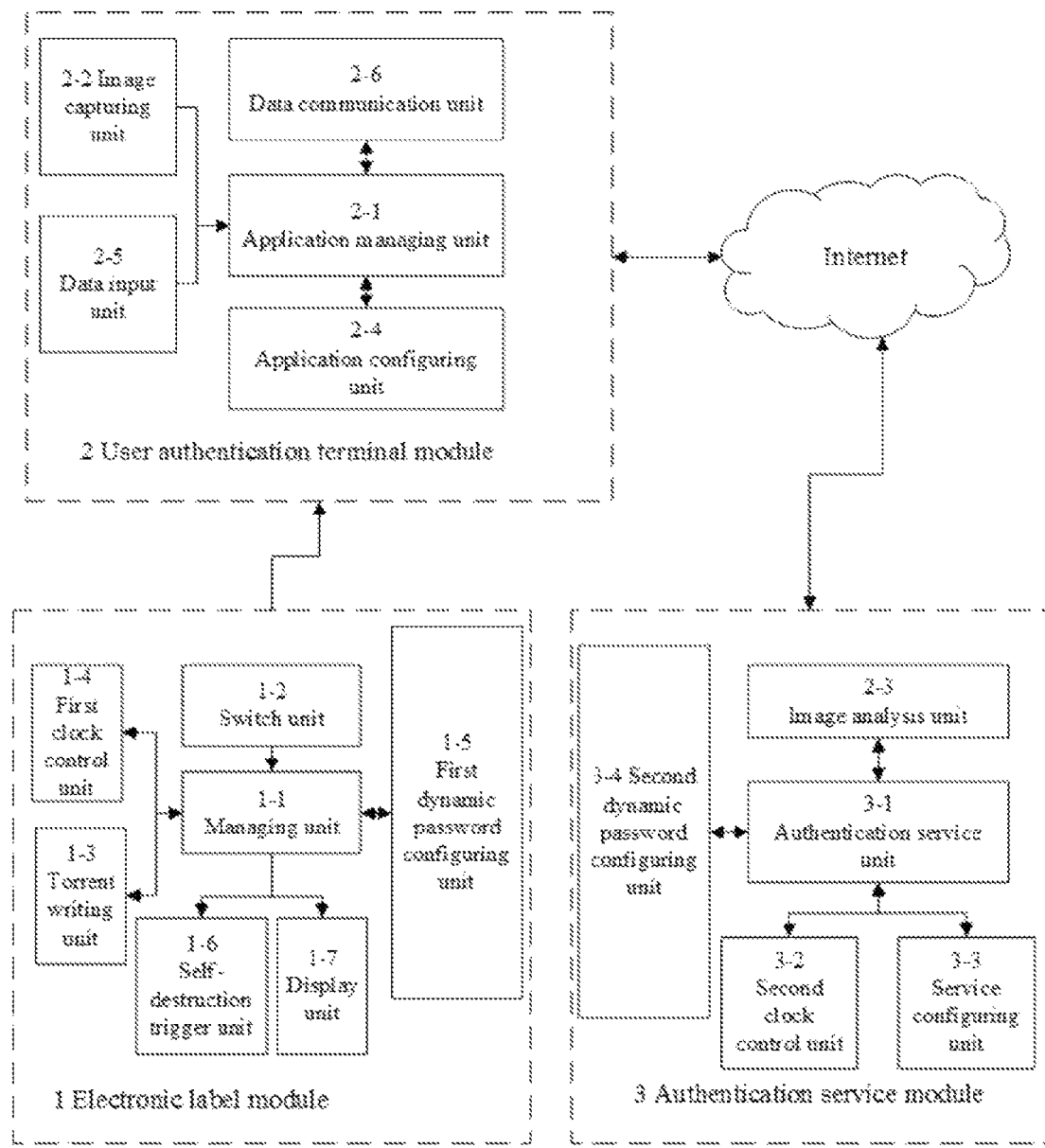
FIG. 4 is a clock synchronized dynamic password security label validity real-time authentication system of the third embodiment as provided by an embodiment of the invention.

In conjunction with the structure depicted in FIG. 4, a modification of the invention comprises three parts: the electronic label module 1, the user authentication terminal module 2, and the authentication service module 3. Electronic label module 1 is used to generate dynamic password data and display. The user authentication terminal module 2 collects the dynamic password data generated by the electronic label module and the image data of the ID number of the electronic label module, and sends the image data to the authentication service module 3 via the internet. The authentication service module 3 receives the image data sent from user authentication terminal module 2. After analyzing processing, the text data is obtained. The authentication is conducted. After the authentication, the authentication service module 3 obtains the result of whether the first dynamic password generating algorithm of electronic label module 1 is consistent with the second dynamic password generating algorithm of authentication service module 3. The result is returned to the user authentication terminal module 2 via the internet, so as to determine the validity of the electronic label module 1.

Above disclosed embodiments are only specific embodiments of the present application. However, the present application is not limited thereto. Any modification, equivalent, and improvement in the spirit and principle of the invention should be seen as within the protective scope of the invention.

The invention claimed is:
1. A clock synchronized dynamic password security label validity real-time authentication method, wherein the clock synchronized dynamic password security label validity real-time authentication method comprising the following steps:
assigning a unique ID number for an electronic label module, wherein the ID number is expressed as IDS1 and located on a surface of the electronic label module; setting an identical clock accumulating cycle in the electronic label module and an authentication server module; writing a product information and related information to a service configuring unit, wherein the product information and the related information are represented by the IDS1 of the electronic label module; defining a torrent file for associating the electronic label module with the authentication service module, wherein the torrent file comprises: a clock data DSS1, a random number RandomD, and the ID number IDS1 of the electronic label module; wherein saving a data TDSH in an application configuring unit represents that a self-destruction device of the electronic label module has been damaged; writing a PSW field, which is used to represent a type of a dynamic password generating algorithm used by the electronic label module whose ID number is IDS1, into a record corresponding to the ID number IDS1 in the service configuring unit;
turning on the electronic label module by a user via a switch unit, detecting, by a managing unit, whether a self-destruction trigger unit is damaged; if the self-destruction trigger unit is damaged, outputting, by the electronic label module, a specific data TDSH via a display unit representing that the electronic label module has already stopped working; if the self-destruction trigger unit works properly, using the managing unit of the electronic label module to initialize a clock data to DSS1 in a first clock cycle according to a clock cycle of a clock control unit; generating, by the managing unit, a dynamic password data DKS1 by the dynamic password generating algorithm PSW1 of a first dynamic password configuring unit, using the clock data DSS1, the random number RandomD, the ID number IDS1 of the electronic label in the torrent file as calculation factors, and displaying the DKS1 on the display unit; then summing up, by the managing unit, an initial clock data DSS1 and the predefined clock accumulating cycle to obtain a second clock data DSS2, and saving the DDS2 in a cache;
capturing, by an image capturing unit controlled by an application managing unit of a user authentication terminal module, an image data IDT1 of the electronic label module, wherein the image data IDT1 of the electronic label module includes the dynamic password data displayed on the display unit and the ID number IDS1 of the electronic label module located on the surface of the electronic label module; locating, segmenting, and analyzing, by the application managing unit of the user authentication terminal module via an image analysis unit, the image data IDT1 to obtain a dynamic password data DZXS displayed on the display unit of the electronic label module and the ID number IDS1 of the electronic label module; and then searching in the application configuring unit; ending an authenticating process, if the DZXS equals to the TDSH, which indicates that the self-destruction device of the electronic label module is damaged; saving the ID number IDS1 into the application configuring unit, if the DZXS does not equal to the TDSH; and then sending the IDS1 and the DZXS to the authentication service module via a data communication unit connected to the Internet.

2. The clock synchronized dynamic password security label validity real-time authentication method according to claim 1, wherein after turning on the electronic label module via the switch unit, writing the torrent file via the torrent writing unit, while at the same time writing the torrent file into the record corresponding to the IDS1 in the service configuring unit of the authentication service module through the Internet.

3. The clock synchronized dynamic password security label validity real-time authentication method according to claim 1, wherein aftersending the IDS1 and the DZXS to the authentication service module, receiving, by the authentication service module, the data IDS1 and the DZXS sent from the user authentication terminal module, and subsequently searching, by the authentication service unit, the record corresponding to the IDS1 in the service configuring unit using the IDS1, and extracting the dynamic password generating algorithm PSW2 adopted by the electronic label module represented by the clock data DSS1, the random number RandomD, and the IDS1 that are initially written into the torrent file; then obtaining, by the authentication service unit, a system time RSS1 of a current authentication service module, and subtracting the DSS1 from the RSS1 to obtain a result, dividing the result by an initially defined clock accumulating cycle to obtain RZSC which is the number of times the electronic label module accumulated in accordance with the clock accumulating cycle; finally, calculating a dynamic password data RKS1 using the RandomD, the DSS1, the RZSC, and the IDS1 as calculation factors;

comparing, by the authentication service unit, the calculated RKS1 with the DZXS; sending a result indicating that this electronic label module is valid to the user authentication terminal module through the Internet, if the RKS1 equals to the DZXS; sending a result indicating that this electronic label module is not valid through the Internet, if the RKS1 does not equal to the DZXS;

displaying the result, after the user authentication terminal module receiving the result fed back from the authentication service module, so as to complete this validity authentication process with respect to the electronic label module.

4. A clock synchronized dynamic password security label validity real-time authentication system, comprising an electronic label module, used for generating dynamic password data and displaying, the electronic label module having an ID number IDS1;

a user authentication terminal module, connected with the electronic label module, and is used for capturing a dynamic password data generated by the electronic label module and an image data of an ID number of the electronic label module; after analyzing, the image data are converted into a text data; then sending the text data to an authentication service module through the Internet; wherein the user authentication terminal module comprises: an application managing unit, an image capturing unit, an image analysis unit, an application configuring unit, a data input unit, and a data communication unit; and the authentication service module, connected with the user authentication terminal module, and is used for obtaining a result of whether a first dynamic password generating algorithm of the electronic label module is consistent with a second dynamic password generating algorithm of the authentication service module, after calculating and validating, and after receiving the text data; and returning the result to the user authentication terminal module, so as to determine the validity of the electronic label module; wherein the authentication service module comprises: an authentication service unit, a second clock control unit, a service configuring unit, and a second dynamic password configuring unit;

wherein the electronic label module further comprises:

a managing unit, used for detecting whether the self-destruction trigger unit is damaged; initialing the clock data to DSS1 during a first clock cycle according to a clock cycle of the first clock control unit; using the clock data DSS1, the random number RandomD, the ID number IDS1 of the electronic label module as calculation factors, wherein the clock data DSS1, the random number RandomD, the ID number IDS1 are stored in the torrent file; generating a dynamic password data DKS1 via the dynamic password generating algorithm PSW1 of the first dynamic password configuring unit, and then displaying the DKS1 on the display unit; then obtaining a second clock data DSS2 by accumulating the initial clock data DSS1 according to the predefined clock accumulating cycle, and saving the DDS2 in the cache;

a switch unit, connected with the managing unit, and is used for turning on the electronic label module;

a torrent writing unit, connected with the managing unit, and is used for writing the torrent file;

a first clock control unit, connected with the managing unit, and is used for outputting the clock cycle;

a first dynamic password configuring unit, connected with the managing unit, and is used for generating the dynamic password data DKS1 via the dynamic password generating algorithm PSW1;

a self-destruction trigger unit, connected with managing unit, and is used for sending a damage signal; and a display unit, connected with managing unit, and is used for displaying the dynamic password data DKS1.

5. The clock synchronized dynamic password security label validity real-time authentication system according to claim 4, wherein the dynamic password generating algorithm in the first dynamic password configuring unit uses a State Encryption Algorithm;

wherein the managing unit transmits the own ID number of the electronic label module and the clock data or a number of times of generating the dynamic password as calculation factors to the first dynamic password configuring unit, to obtain the dynamic password data; wherein the dynamic password data is selected from a group consisting of: a number, a character, a combination of a number and a character, a bar code, a two-dimension code, or any password expression form;

wherein the electronic label module transmits the data to the user authentication terminal module using a display screen, an NFC, a RFID, or infrared.

6. The clock synchronized dynamic password security label validity real-time authentication system according to claim 4, wherein the user authentication terminal module further comprises:

an application managing unit, used for controlling the image capturing unit to capture the image data IDT1 of the electronic label module; locating, segmenting, and analyzing the image data IDT1 by the image analysis unit, obtaining a dynamic password data DZXS displayed on the display unit and the ID number IDS1 of the electronic label module; and then searching in the application configuring unit;

an image capturing unit, connected with the application managing unit, and is used for collecting the image data IDT1 of the electronic label module;

an image analysis unit, connected with the application managing unit, and is used for locating, segmenting, and analyzing the image data IDT1;

an application configuring unit, connected with the application managing unit, and is used for storing data TDSH representing that self-destruction device the electronic label module is damaged, and a small database temporally storing a dynamic password data DZXS;

a data input unit, connected to the application managing unit, and is used for inputting the second dynamic password data DZXS for searching; and a data communication unit, connected to the application managing unit, and is used for sending the IDS1 and the DZXS to the authentication service module through the internet.

7. The clock synchronized dynamic password security label validity real-time authentication system according to claim 4, wherein the authentication service module further comprises:

an authentication service unit, used for extracting the dynamic password generating algorithm PSW2 adopted by the electronic label module, which is represented by the clock data DSS1, the random number RandomD, and the IDS1 that are initially written into the torrent file; obtaining a system time RSS1 of a current authentication service module; calculating a dynamic password data RKS1 via the dynamic password generating algorithm PSW2 of the second dynamic password configuring unit; comparing the calculated RKS1 with the DZXS;

a second clock control unit, connected to the authentication service unit, and is used for providing a clock signal for the authentication service unit;

a service configuring unit, connected with the authentication service unit, and is used as a database for storing different characteristics of the IDS1; and a second dynamic password configuring unit, connected to the authentication service unit, and is used for calculating a dynamic password data RKS1 via the dynamic password generating algorithm PSW2.

8. The clock synchronized dynamic password security label validity real-time authentication system according to claim 7, wherein the service configuring unit is a database which is configured to be read and written by the authentication service unit; the service configuring unit configuring a characteristic of the electronic label module using the ID of the electronic label module, and saving a product information represented by the electronic label module and a characteristic of the electronic label module in the database;

wherein multiple dynamic password generating algorithms corresponding to the electronic label module are positioned in the second dynamic password configuring unit of the authentication service module.

* * * * *